United States Patent
Orthner (10) Patent No.: US 7,912,085 B1
(45) Date of Patent: Mar. 22, 2011

(54) PROGRAMMABLE PACKET FORMAT CONVERTER

(75) Inventor: Kent Orthner, Santa Cruz, CA (US)

(73) Assignee: Altera Corporation, San Jose, CA (US)

( * ) Notice: Subject to any disclaimer, the term of this patent is extended or adjusted under 35 U.S.C. 154(b) by 475 days.

(21) Appl. No.: 11/906,204

(22) Filed: Oct. 1, 2007

(51) Int. Cl.
*H04J 3/16* (2006.01)
*H04J 3/22* (2006.01)

(52) U.S. Cl. ...................................... 370/466

(58) Field of Classification Search .................. 370/400, 370/466, 465, 467, 492, 493, 430, 389, 352, 370/356, 411, 395, 412, 394, 230, 388; 709/249, 709/244, 250; 711/202, 105, 157; 712/11; 714/807; 341/51; 365/185
See application file for complete search history.

(56) References Cited

U.S. PATENT DOCUMENTS

| | | | | |
|---|---|---|---|---|
| 4,639,921 A * | 1/1987 | Gang et al. | ..................... | 714/807 |
| 5,612,693 A * | 3/1997 | Craft et al. | ...................... | 341/51 |
| 5,748,905 A * | 5/1998 | Hauser et al. | ................. | 709/249 |
| 6,002,692 A * | 12/1999 | Wills | ........................... | 370/465 |
| 6,047,002 A * | 4/2000 | Hartmann et al. | ........... | 370/466 |
| 6,249,528 B1 * | 6/2001 | Kothary | ........................ | 370/466 |
| 6,345,050 B1 * | 2/2002 | Alleyne et al. | ................ | 370/389 |
| 2001/0048662 A1 * | 12/2001 | Suzuki et al. | ................. | 370/230 |
| 2002/0167955 A1 * | 11/2002 | Shimojo | ....................... | 370/411 |
| 2004/0250055 A1 * | 12/2004 | Flanigan | .......................... | 713/1 |
| 2005/0166033 A1 * | 7/2005 | Jacob | ............................. | 712/11 |
| 2007/0014309 A1 * | 1/2007 | Lewin et al. | ................... | 370/466 |
| 2008/0266970 A1 * | 10/2008 | Lee et al. | ................. | 365/185.19 |

* cited by examiner

*Primary Examiner* — Pankaj Kumar
*Assistant Examiner* — Prenell P Jones
(74) *Attorney, Agent, or Firm* — Mauriel Kapouytian & Treffert LLP; Ararat Kapouytian (57) ABSTRACT

A packet format converter (PFC) that can be programmed to perform any one of a multiple number of different packet format conversions is described. According to one embodiment, the PFC includes a pattern state machine and a pattern memory coupled to the pattern state machine. The pattern memory stores pattern memory data including pointer information. The pointer information is either for writing data to be input into the PFC or reading data to be output by the PFC. The pattern state machine is programmed based on the pattern memory data. Also in one embodiment, the PFC further includes a backpressure control for issuing ready and valid signals for the PFC, wherein the ready signal indicates whether the PFC is ready to accept input data and the valid signal indicates whether the PFC has valid data to output.

24 Claims, 7 Drawing Sheets

PROGRAMMABLE PACKET FORMAT CONVERTER

BACKGROUND

The present invention relates to packet format converters (PFCs).

Many components, such as intellectual property (IP) components, that process packets can only process packets if they are formatted in a particular way. If a packet to be processed by a component is not in the required format, it must be converted into the required format. One way to accomplish this is to specifically design a PFC that converts packets from one format to another required format. This would typically require the system designer to hand write hardware description language (HDL) code as part of the design process. Disadvantages of this method include the following. First, a specifically designed PFC is applicable for only converting packets of one specific format into packets of another specific format. In other words, the specifically designed PFC lacks flexibility. Second, this design process is typically slow and time consuming since, as noted above, the system designer must typically hand write HDL code as part of designing the PFC.

SUMMARY

In one aspect, an embodiment of the present invention provides a PFC that can be programmed to perform any one of a multiple number of different packet format conversions. This provides a significant degree of flexibility.

According to one embodiment, the PFC includes a pattern state machine and a pattern memory coupled to the pattern state machine. The pattern memory stores pattern memory data including pointer information. The pointer information is either for writing data to be input into the PFC or reading data to be output by the PFC. The pattern state machine is programmed based on the pattern memory data. Also in one embodiment, the PFC further includes a backpressure control for issuing ready and valid signals for the PFC, wherein the ready signal indicates whether the PFC is ready to accept input data and the valid signal indicates whether the PFC has valid data to output.

BRIEF DESCRIPTION OF THE DRAWINGS

The novel features of the invention are set forth in the appended claims. However, for purpose of explanation, several aspects of particular embodiments of the invention are described by reference to the following figures.

DETAILED DESCRIPTION

The following description is presented to enable any person skilled in the art to make and use the invention, and is provided in the context of particular applications and their requirements. Various modifications to the exemplary embodiments will be readily apparent to those skilled in the art, and the generic principles defined herein may be applied to other embodiments and applications without departing from the spirit and scope of the invention. Thus, the present invention is not intended to be limited to the embodiments shown, but is to be accorded the widest scope consistent with the principles and features disclosed herein.

Figure 1:
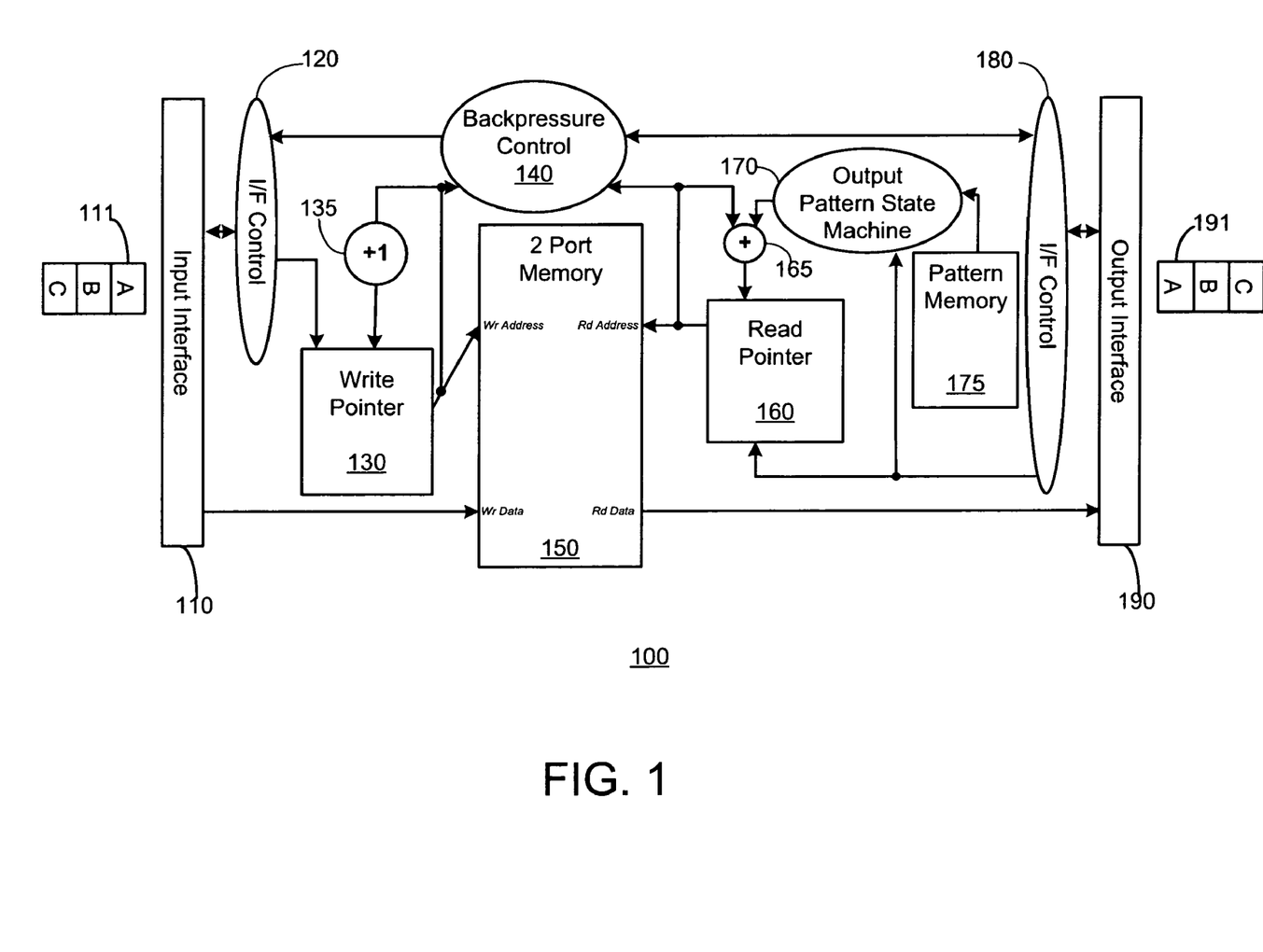
FIG. 1 is a block diagram of one embodiment of the PFC of the present invention.

FIG. 1 is a block diagram of one embodiment of the PFC of the present invention. PFC 100 has one input interface (I/F) 110 and one output I/F 190. Input I/F 110 receives input signals, such as input signal 111 that is one symbol wide (i.e., has one symbol path or has a symbol per beat rate of 1). Input signal 111 includes symbols A, B, and C, which may also herein be referred to as fields A, B, and C. In one embodiment, input symbols A, B, and C together constitute an input packet. In such an embodiment, the input packet is one symbol wide and three symbols long (which may also herein be referred to as three cycles long). In one embodiment, each of symbols A, B, and C is one byte wide. In other embodiments, symbols A, B, and C may be smaller or larger than one byte in width. Similarly, output I/F 190 outputs output signals, such as output signal 191 that is also one symbol wide. Output signal 191 includes symbols C, B, and A, which in this embodiment are arranged in an order different from that of input signal 111. In one embodiment, output symbols C, B, and A together constitute an output packet. In such an embodiment, the output packet is one symbol wide and three symbols long. In one embodiment, PFC 100 receives a packet stream via input I/F 110 and outputs a packet stream via output I/F 190.

In one embodiment, input I/F control 120 is compliant with Altera® Corporation's Avalon™ Streaming Interface Specification. Similarly, in one embodiment, input signals, such as input signal 111, are also compliant with Altera® Corporation's Avalon™ Streaming Interface Specification. Among other things, input I/F control 120 manages start of packet, end of packet, empty (for empty fields at the end of a packet), and data signals for input signal 111, ready and valid signals for input I/F 110, and clock enable signals for write pointer 130. In one embodiment, the ready and valid signals for input I/F 110 respectively correspond to the ready signal for input I/F 110 provided by backpressure control 140 and the valid signal for input I/F 110 provided by the component (not shown) sending data to PFC 100 via input I/F 110. The clock enable signal for write pointer 130 has a high binary value when the ready and valid signals for input I/F 110 both have high binary values. In one embodiment, the ready signal has a high binary value when data can be written to memory 150 without overriding other data from memory 150 that has not yet been read out of memory 150 to be provided as an output of PFC 100. Also, in one embodiment, the valid signal has a high binary value when PFC 100 has valid data to receive via input I/F 110. A detailed description regarding determining ready and valid signals by a backpressure control is provided below in relation to FIGS. 5 and 6.

The backpressure control 140 sends the ready signal to input I/F control 120. Input I/F control 120 sends the clock enable signal to write pointer 130. This allows write pointer 130 to increment its count by one, which is coincident with the writing of a new field of input signal 111 into memory 150. In one embodiment, incrementing the count of write pointer 130 by one is accomplished by adding one at adder 131 to the output count of writer pointer 130. The output of write pointer 130 is provided as a write address to memory 150, which in one embodiment is a 2-port memory, to indicate to memory 150 where the incoming field of input signal 111 should be written. The output of write pointer 130 is also provided to backpressure control 140.

Figure 4:
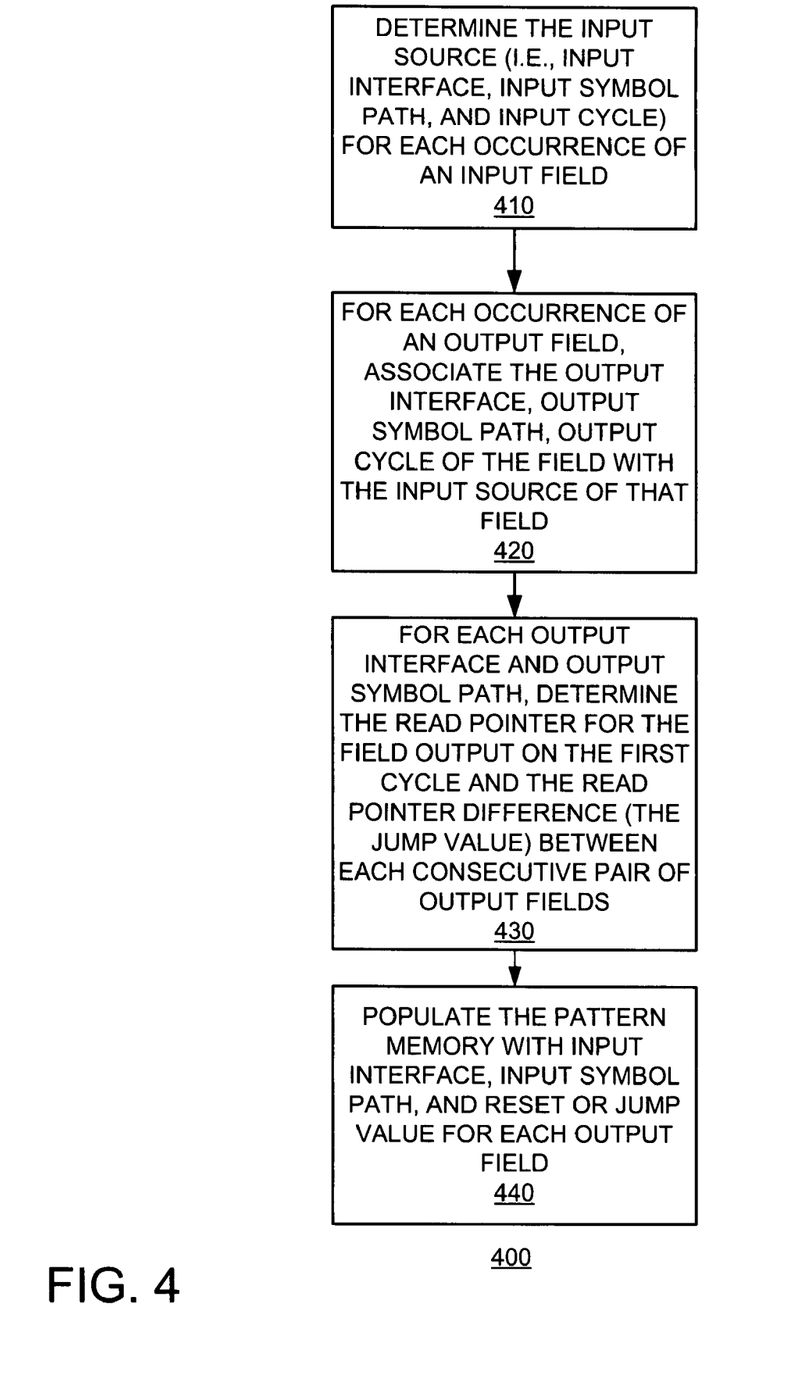
FIG. 4 is a flowchart for one embodiment of the method of the present invention for determining pattern memory contents and populating the pattern memory with the determined pattern memory contents.

Data is read from memory 150 as determined by the address provided by read pointer 160. The address of read pointer 160 is the sum of the previous read pointer address and the output of output pattern state machine 170. These values are added by adder 165. The output of output pattern state machine 170 is determined by values provided to it by pattern memory 175, which in one embodiment is a random access memory (RAM). More specifically, the output of output pattern state machine 170 depends on the jump value, i.e., the address difference between the current field to be read and the previous field that was read. The values provided by pattern memory 175 depend on the relative position of the output fields in output signal 191 with respect to the input fields in input signal 111. FIG. 4 below provides a detailed description of the general process for determining the pattern memory data.

Read pointer 160 also receives a clock enable signal from output I/F control 180. In one embodiment, output I/F control 180 is compliant with the Avalon™ Streaming Interface Specification. Similarly, in one embodiment, output signals, such as output signal 191, are compliant with Altera® Corporation's Avalon™ Streaming Interface Specification. Among other things, output I/F control 180 manages start of packet, end of packet, empty (for empty fields at the end of a packet) and data signals for output signal 191, ready and valid signals for output I/F 190 and clock enable signals for read pointer 160 and output pattern state machine 170. In one embodiment, the ready and valid signals for output I/F 190 respectively correspond to the ready signal for output I/F 190 provided by the component (not shown) receiving data from PFC 100 via output I/F 190 and the valid signal for output I/F 190 provided by backpressure control 140. As noted above, a detailed description regarding determining ready and valid signals by a backpressure control is provided below in relation to FIGS. 5 and 6.

The clock enable signal has a high binary value when the ready and valid signals for output I/F 190 both have a high binary value. The ready signal has a high binary value when the component receiving data from PFC 100 via output I/F 190 is ready to receive data from PFC 100 via output I/F 190. The valid signal has a high binary value when the data field to be output by PFC 100 via output I/F 190 is available in memory 150.

Output I/F control 180 sends the clock enable signal to read pointer 160 and output pattern state machine 170. This allows read pointer 160 to receive an updated read pointer address from adder 165 and to provide that address to memory 150. It also allows output pattern state machine to provide its output to adder 165. As a result of read pointer 160 providing a read address to memory 150, data stored at that memory address is provided to output I/F 190. The address provided by read pointer 160 is also sent to backpressure control 140.

Figure 2:
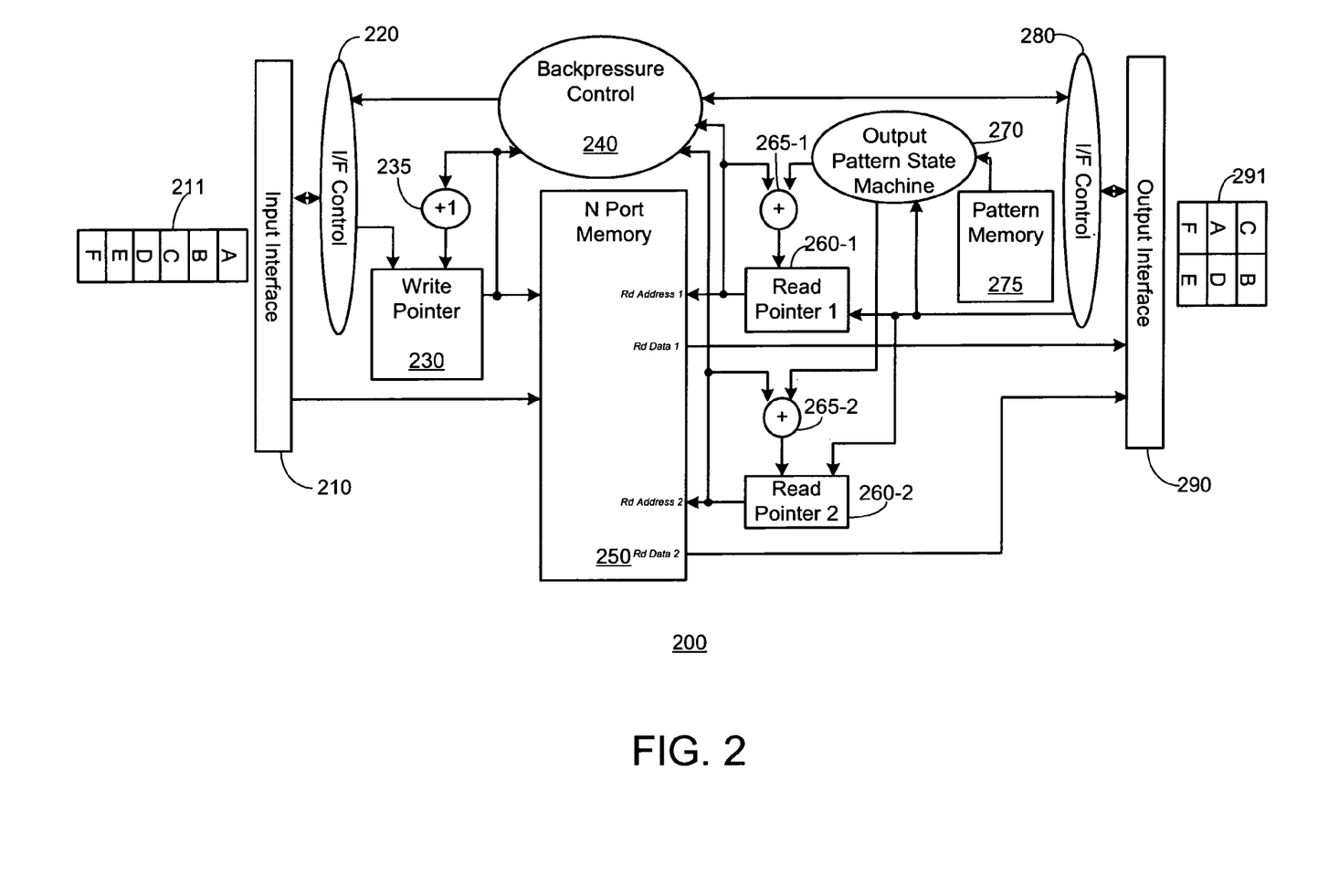
FIG. 2 is a block diagram of another embodiment of the PFC of the present invention.

FIG. 2 is a block diagram of another embodiment of the PFC of the present invention. PFC 200 includes input I/F 210, input I/F control 220, write pointer 230, adder 235, backpressure control 240, memory 250, read pointers 260-1 and 260-2, adders 265-1 and 265-2, output pattern state machine 270, pattern memory 275 (which in one embodiment is a RAM), output I/F control 280, and output I/F 290.

With the exceptions noted below, PFC 200 is similar to PFC 100. Components and signals in PFC 200 that serve similar functions as their counterparts in PFC 100 have been designated with reference numbers that differ from those of their counterparts by one hundred. For example, write pointer 230 and backpressure control 240 in PFC 200 respectively correspond to write pointer 130 and backpressure control 140 in PFC 100. Also, where multiple components in PFC 200 have a corresponding counterpart in PFC 100, such components in PFC 200 have been designated with reference numbers that are in two parts. The first part of such a reference number is the base reference number which appears before a hyphen and differs from that of its counterpart in PFC 100 by one hundred. The second part of such a reference number which appears after a hyphen further identifies that component in PFC 200. For example, read pointers 260-1 and 260-2 in PFC 200 correspond to read pointer 160 in PFC 100. The first part of reference numbers 260-1 and 260-2, i.e., "260", differs from the reference number 160 of read pointer 160 by one hundred. The second part of reference numbers 260-1 and 260-2, i.e., "1" and "2", further respectively identify read pointers 260-1 and 260-2 in PFC 200. As PFC 200 is similar to PFC 100 and operates in a similar fashion, it will not be described in greater detail here, except to note some of its differences relative to PFC 100.

One of the main differences between PFCs 200 and 100 is that PFC 200 has an output signal 291 that is two symbols wide rather than one symbol wide (i.e., has two symbol paths rather than one or has a symbol per beat rate of 2). Output signal 291 has a packet size that is two symbols wide and three symbols long and includes symbols C, A, F and B, D, E on the first and second symbol paths, respectively.

As output signal 291 is two symbols wide, PFC 200 has two read pointers 260-1 and 260-2 and two corresponding adders 265-1 and 265-2. Additionally, PFC 200 has an N-port memory, where N is equal to 3. Of the three ports, one port is for writing data and the other two are for reading data. Read pointer 260-1 and its corresponding adder 265-1 are for reading data from memory 250 for outputting on the first symbol path of output I/F 290. The first symbol path includes symbols C, A, and F in output signal 291. On the other hand, read pointer 260-2 and its corresponding adder 265-2 are for reading data from memory 250 for outputting on the second symbol path of output I/F 290. The second symbol path includes symbols B, D, and E in output signal 291.

PFC 200 receives input packets that are one symbol wide and six symbols long (such as input signal 211, which includes symbols A, B, C, D, E, and F) and converts them into packets that are two symbols wide and three symbols long. Additionally, in the example shown in FIG. 2, the arrangement of fields in output signal 291 is different from that in input signal 211. This change in arrangement is also produced by PFC 200. Thus, PFC 200 provides packet format conversion by both rearranging the order of symbols and changing the symbol parallelization (by converting serial symbols received at the input into parallel symbols at the output).

Figure 3:
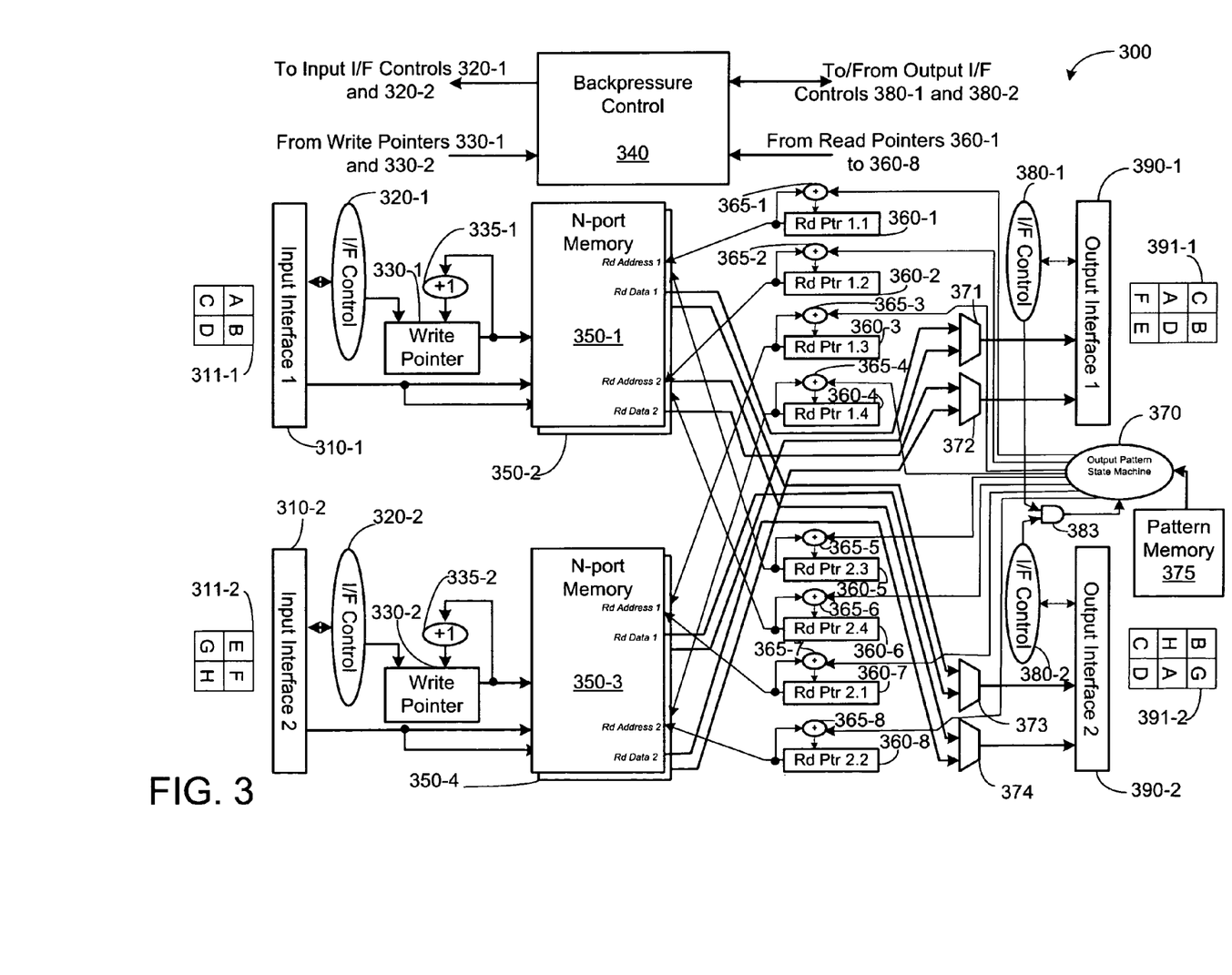
FIG. 3 is a block diagram of yet another embodiment of the PFC of the present invention.

FIG. 3 is a block diagram of yet another embodiment of the PFC of the present invention. PFC 300 includes input I/Fs 310-1 and 310-2, input I/F controls 320-1 and 320-2, write pointers 330-1 and 330-2, adders 335-1 and 335-2, backpressure control 340, memories 350-1, 350-2, 350-3, and 350-4, read pointers 360-1, 360-2, 360-3, 360-4, 360-5, 360-6, 360-7, and 360-8, adders 365-1, 365-2, 365-3, 365-4, 365-5, 365-6, 365-7, and 365-8, output pattern state machine 370, pattern memory 375 (which in one embodiment is a RAM), output I/F controls 380-1 and 380-2, and output I/Fs 390-1 and 390-2. Additionally, PFC 300 includes multiplexers 371, 372, 373, and 374 and AND gate 383.

With the exceptions noted below, PFC 300 is similar to PFC 100. Components and signals in PFC 300 that serve similar functions as their counterparts in PFC 300 have been designated with reference numbers that differ from those of their counterparts by two hundred. For example, backpressure control 340 and output pattern state machine 370 in PFC 300 respectively correspond to backpressure control 140 and output pattern state machine 170 in PFC 100. Also, where multiple components in PFC 300 have a corresponding counterpart in PFC 100, such components in PFC 300 have been designated with reference numbers that are in two parts. The first part of such a reference number is the base reference number which appears before a hyphen and differs from that of its counterpart in PFC 100 by two hundred. The second part of such a reference number which appears after a hyphen further identifies that component in PFC 300. For example, write pointers 330-1 and 330-2 in PFC 300 correspond to write pointer 130 in PFC 100. The first part of reference numbers 330-1 and 330-2, i.e., "330", differs from the reference number 130 of write pointer 130 by two hundred. The second part of reference numbers 330-1 and 330-2, i.e., "1" and "2", further respectively identify write pointers 330-1 and 330-2 in PFC 300. To the extent that PFC 300 is similar to PFC 100 and operates in a similar fashion, it will not be described in greater detail here. However, the ways in which PFC 300 differs from PFC 100 will be noted below.

One of the main differences between PFCs 300 and 100 is that PFC 300 has two input I/Fs 310-1 and 310-2 and two output I/Fs 390-1 and 390-2 rather than one. Additionally, each of input signals 311-1 and 311-2 is two symbols wide rather than one symbol wide (i.e., they each include two symbol paths rather than one or have a symbol per beat rate of 2 rather than 1). Similarly, each of output signals 391-1 and 391-2 is also two symbols wide rather than one symbol wide. Input signal 311-1 has a packet size that is two symbols wide and two symbols long and includes symbols A, C and B, D on the first and second symbol paths, respectively. Input signal 311-2 also has a packet size that is two symbols wide and two symbols long and includes symbols E, G and F, H on the first and second symbol paths, respectively. Output signal 391-1 has a packet size that is two symbols wide and three symbols long and includes symbols C, A, F and B, D, E on the first and second symbol paths, respectively. Output signal 391-2 has a packet size that is two symbols wide and three symbols long and includes symbols B, H, C and G, A, D on the first and second symbol paths, respectively. Thus, PFC 300 receives input packets that are two symbol wide and two symbols long and converts them into packets that are two symbols wide and three symbols. Additionally, in the example shown in FIG. 3, the arrangement of symbols in output signals 391-1 and 391-2 is different from that in input signals 311-1 and 311-2. This change in arrangement is also produced by PFC 300.

Input data received via input I/F 310-1, e.g., input signal 311-1 that is two symbols wide, is stored in two memories 350-1 and 350-2. Both fields in the first symbol path of input signal 311-1, e.g., fields A and C, and fields in the second symbol path of input signal 311-1, e.g., fields B and D, are stored in both memory 350-1 and memory 350-2. Similarly, input data received via input I/F 310-2, e.g., input signal 311-2 that is two symbols wide, is stored in two memories 350-3 and 350-4. Both fields in the first symbol path of input signal 311-2, e.g., fields E and G, and fields in the second symbol path of input signal 311-2, e.g., fields F and H, are stored in memory 350-3 and memory 350-4.

Each of memories 350-1 to 350-4 is an N-port memory, where N is equal to 3. Of the three ports, one is for writing data and the other two are for reading data. In one embodiment, each of the two read ports are read by different read pointers. Also, in one embodiment, each write port can write data that is two fields wide to the memory. Similarly, in one embodiment, each read port can read out data that is two fields wide from memory.

Although in FIG. 3, the output of write pointer 330-1 is not shown as being applied to memory 350-2, it is in fact applied thereto. Thus, write pointer 330-1 is used as the address pointer for memories 350-1 and 350-2. In one embodiment, fields from both the first and second symbol path of input signal 311-1 are stored in memories 350-1 and 350-2. More specifically, both fields received on the same clock cycle (e.g., fields A and B) are stored at the same addresses in memories 350-1 and 350-2. In one embodiment, memories 350-1 and 350-2 have the same size.

Similarly, although in FIG. 3, the output of write pointer 330-2 is not shown as being applied to memory 350-4, it is in fact applied thereto. Thus, write pointer 330-2 is used as the address pointer for memories 350-3 and 350-4. In one embodiment, fields from both the first and second symbol path of input signal 311-2 are stored in memories 350-3 and 350-4. More specifically, both fields received on the same clock cycle (e.g., fields E and F) are stored at the same addresses in memories 350-3 and 350-4. In one embodiment, memories 350-3 and 350-4 have the same size. Also in one embodiment, memories 350-1 to 350-4 all have the same size.

In another embodiment, data received via input I/F 310-1 may all be written into one memory rather than two. Similarly, in another embodiment, data received via input I/F 310-2 may all be written into one memory rather than two. In such an embodiment, each memory would be a 5-port memory, one port for writing data and four for reading data.

PFC 300 includes two write pointers 330-1 and 330-2 rather than one. Write pointers 330-1 and 330-2 separately send their write pointer addresses to backpressure control 340. Backpressure control 340 in turn separately sends ready signals to input I/Fs 310-1 and 310-2. A detailed description regarding determining ready and valid signals by a backpressure control is provided below in relation to FIGS. 5 and 6.

PFC 300 also includes two output I/F controls 380-1 and 380-2 as it has two output I/Fs 390-1 and 390-2. Output I/F control 380-1 receives a valid signal from backpressure control 340 indicating that one or more of memories 350-1 to 350-4 has data to be output via output I/F 390-1. Output I/F control 380-1 also receives a ready signal from the component (not shown) downstream of PFC 300 that is to receive data from PFC 300 via output I/F 390-1. When both these ready and valid signals have a high binary value, output I/F control 380-1 issues a clock enable signal that has a high binary value. Similarly, output I/F control 380-2 receives a valid signal from backpressure control 340 indicating that one or more of memories 350-1 to 350-4 has valid data to be output via output I/F 390-2. Output I/F control 380-2 also receives a ready signal from the component (not shown) downstream of PFC 300 that is to receive data from PFC 300 via output I/F 390-2. When both these ready and valid signals have a high binary value, output I/F control 380-2 issues a clock enable signal that has a high binary value.

In one embodiment, the data output via output I/Fs 390-1 and 390-2 are locked. In other words, output I/Fs 390-1 and 390-2 output data together, such that on any clock cycle either both output I/Fs 390-1 and 390-2 output data or neither of them output data. As the outputs of output I/Fs 390-1 and 390-2 are locked, the clock enable signals from output I/F controls 380-1 and 380-2 are sent to AND gate 383. The output of AND gate 383, a clock enable signal, is sent to the output pattern state machine 370. Although not shown in FIG. 3 in order to avoid overcomplicating the drawing, the output of AND gate 383 is also sent to read pointers 360-1 to 360-8 as a clock enable signal. As the output of AND gate 383 has a high binary value only when the clock enable signals from both output I/F controls 380-1 and 380-2 have a high binary value, use of AND gate 383 ensures that the outputs of output I/Fs 390-1 and 390-2 are locked. In one embodiment, the start of packet for output packets (e.g., output signals 391-1 and 391-2) output via output I/Fs 390-1 and 390-2 are locked with each other, i.e., they are synchronized.

As noted above, PFC 300 also includes eight read pointers and adders associated therewith. Read pointers 360-1 and 360-2 (which in FIG. 3 are also respectively designated as Rd Ptr 1.1 and Rd Ptr 1.2) are for pointing the address of data to be read from memory 350-1. Read pointers 360-3 and 360-4 (which in FIG. 3 are also respectively designated as Rd Ptr 1.3 and Rd Ptr 1.4) are for pointing the address of data to be read from memory 350-4. Read pointers 360-5 and 360-6 (which in FIG. 3 are also respectively designated as Rd Ptr 2.3 and Rd Ptr 2.4) are for pointing the address of data to be read from memory 350-2. Read pointers 360-7 and 360-8 (which in FIG. 3 are also respectively designated as Rd Ptr 2.1 and Rd Ptr 2.2) are for pointing the address of data to be read from memory 350-3.

PFC 300 also includes multiplexers 371, 372, 373, and 374. Multiplexer 371 receives data from memories 350-1 and 350-4. More specifically, multiplexer 371 receives data from memories 350-1 and 350-4, where the data received from each of these memories is 2 fields wide. Thus, multiplexer 371 receives four fields of input data, where the source input interface and input symbol path combination for each field is different from that of the other three fields. Similarly, multiplexer 372 receives data from memories 350-1 and 350-4. More specifically, multiplexer 372 receives data that is two fields wide from memory 350-1 and data that is two fields wide from memory 350-4. Thus, multiplexer 372 receives four fields of input data, where the source input interface and input symbol path combination for each field is different from that of the other three fields. Similarly, multiplexer 373 receives data from memories 350-2 and 350-3. More specifically, multiplexer 373 receives data that is two fields wide from memory 350-2 and data that is two fields wide from memory 350-3. Thus, multiplexer 373 receives four fields of input data, where the source input interface and input symbol path combination for each field is different from that of the other three fields. Similarly, multiplexer 374 receives data from memories 350-2 and 350-3. More specifically, multiplexer 374 receives data that is two fields wide from memory 350-2 and data that is two fields wide from memory 350-3. Thus, multiplexer 374 receives four fields of input data, where the source input interface and input symbol path combination for each field is different from that of the other three fields.

It is to be noted that the data output by each of memories 350-1 to 350-4 is determined by the read pointer address received by each of those memories. Data output by memory 350-1 to multiplexer 371 is determined by the read pointer address received from read pointer 360-1. Data output by memory 350-1 to multiplexer 372 is determined by the read pointer address received from read pointer 360-2. Data output by memory 350-2 to multiplexer 373 is determined by the read pointer address received from read pointer 360-5. Data output by memory 350-2 to multiplexer 374 is determined by the read pointer address received from read pointer 360-6. Data output by memory 350-3 to multiplexer 373 is determined by the read pointer address received from read pointer 360-7. Data output by memory 350-3 to multiplexer 374 is determined by the read pointer address received from read pointer 360-8. Data output by memory 350-4 to multiplexer 371 is determined by the read pointer address received from read pointer 360-3. Data output by memory 350-4 to multiplexer 372 is determined by the read pointer address received from read pointer 360-4.

Although not shown in FIG. 3 in order to avoid overcomplicating the drawing, multiplexers 371 to 374 receive select signals from output pattern state machine 370. The select signal is a two bit signal that indicates the input interface and input symbol path of the data that the multiplexer is to select. As noted above each multiplexer receives input data that is four fields wide, with each field being from a different input interface and input symbol path combination. Therefore, the select signal identifying the input interface and input symbol path allows the multiplexer to select the input field from the proper source. In one embodiment, the fields output by multiplexers 371, 372, 373, and 374 are respectively sent to the first symbol path of output signal 391-1, the second symbol path of output signal 391-1, the first symbol path of output signal 391-2, and the second symbol path of output signal 391-2. As noted below in relation to FIG. 4 below, the input interface and input symbol path information are part of the data stored in the pattern memory, which is also referred to herein as pattern memory data. As also noted below in relation to FIG. 4, the pattern memory data also includes read pointer information, i.e., the jump or reset value.

It is to be noted that the present invention is not limited to the above described exemplary PFCs. In one embodiment, the PFC may support 1 to 16 input interfaces and 1 to 16 output interfaces. Additionally, the PFC may support 1 to 32 input symbol paths (i.e., symbols per beat) and 1 to 32 output symbol paths. Also the symbol width (which specifies the bits per symbol used by all the PFC input and output interfaces) may be 1 to 512 bits. However, it is to be noted that other numbers for the above parameters may also be supported by a PFC of the present invention.

FIG. 4 is a flowchart for one embodiment of the method of the present invention for determining pattern memory contents and populating the pattern memory with the determined pattern memory contents. The pattern memory contents may also herein be referred to as the pattern memory data.

At 410, for each occurrence of an input field, the input source is determined. In other words, for each occurrence of an input field, the input interface, the input symbol path, and the input cycle that is the source of that occurrence of the input field is identified. This is done for all occurrences of input fields over all input interfaces, all input symbol paths, and all input cycles. At this stage, it is also determined whether the same field is available from more than one input interface. If so, then an error message indicating that the field name is available from multiple input interfaces is issued because in such a case one cannot determine unambiguously from which input interface to get the field. Also at this stage, for each input field name, the number of times that an input field with that name is received is counted.

At 420, for each occurrence of an output field, the output interface, the output symbol path, and the output cycle is associated with the input source for that occurrence of the output field. In other words, for each occurrence of an output field, the output interface, the output symbol path, and the output cycle for that occurrence of the output field is associated with the input interface, the input symbol path, and the input cycle from which the field was received. This is done for all occurrences of output fields over all output interfaces, all output symbol paths, and all output cycles. Also at this stage, for each output field name, the number of times that an output field with that name is output is counted. If the input count does not match the output count for each field name, then an error message is issued because the number of times fields with a particular name are input should equal the number of times fields with that same name are output.

At 430, for each output interface and output symbol path, the read pointer for the field output on the first cycle of the first output packet is determined. The read pointer for this output cycle is the input cycle for the source of the field. Also, for all other output cycles of the first output packet, for each output interface and output symbol path, the read pointer value difference (i.e., the jump value) is determined. For each of these output cycles, the jump value is the difference between the read pointer for the field at the output cycle and the read pointer for the field at the previous output cycle. For output packets after the first output packet, the first cycle read pointer is equal to the read pointer for the first cycle of the previous packet plus the number of cycles in the packet, i.e., the packet length. For output packets after the first output packet, the jump value for cycles after the first cycle is determined as before. In other words, it is the difference between the read pointer for the field at the output cycle and the read pointer for the field at the previous output cycle.

At 440, the pattern memory is populated with the pattern memory data, which for each output field includes the input interface and the input symbol path for the source field and the reset value (for the first output cycle of the first output packet) or jump value (for all other output cycles). The reset value or the jump value may also herein be referred to as the read pointer information. For each output field, the pattern memory data for the output field is associated with the output interface, output symbol path, and output cycle of the output field. In one embodiment, information regarding the output interface, output symbol path, and output cycle of the output field is used as an address of the pattern memory data for that output field. In one embodiment, the format for the packet memory data is as follows: PatternMemory(output interface, output symbol path, output cycle)=(input interface, input symbol path, reset or jump).

Below is pseudo code that describes an embodiment of the method of the present invention for determining pattern memory contents and populating the pattern memory with the determined pattern memory contents. To the extent there are any inconsistencies between the pseudo code and flowchart 400 of FIG. 4 and its associated description, flowchart 400 and its associated description should be interpreted in a manner consistent with the method set forth in the below pseudo code.

```
// Step 1: Find the Input source for each Field.
For each input interface InInterface {
    For each input symbol path InSymbolPath {
        For each input cycle InCycle {
            InName<=the name of the field at the input position.
            If (InSource[InName,0] exists) and (InSource[InName,0] !=InInterface) {
                Error: Field named InName exists at two inputs
            }
            InSource[InName,InCount[InName]]<=(InInterface, InSymbolPath,InCycle)
            InCount[InName]<=InCount[InName]+1;
        }
    }
}
// Step 2: For each symbol path/cycle of each output interaface, determine which
// input interface, symbol path, and cycle it comes from.
For each output interface OutInterface {
    OutCount[*]<=0;
    For each output symbol path OutSymbolPath {
        For each output cycle OutCycle {
            OutName<=name of the field at (OutInterface,OutSymbolPath,OutCycle)
            (InInterface, InSymbolPath, InCycle)=InSource[InName, OutCount[OutName]])
            OutSource[OutInterface, OutSymbolPath, OutCycle]= (InInterface, InSymbolPath, InCycle)
            OutCount[OutName]<=OutCount[OutName]+1;
        }
        If (OutCount[OutName]=InCount[OutName]) {
            Error: Input and Output have different number of OutName}
        }
    }
}
// Step 3: Determine the data to go into the pattern RAM: Instead of the pointer
// value itself, we need to know how much to add to the pointer for each cycle.
For each output interface OutInterface {
    For each output symbol path OutSymbolPath {
        For each output cycle OutCycle {
            If (OutCycle==0) {
                PatternRam[OutInterface, OutSymbolPath, OutCycle]=(InInterface, InSymbolPath, InCycle)
            } else {
                (PrevInInterface, PrevInCycle)=
                    OutSource[OutInterface, OutSymbolPath, (OutCycle-1)]
                Jump=InCycle-PrevInCycle
                PatternRam[OutInterface, OutSymbolPath, OutCycle]=(InInterface, InSymbolPath, Jump)
            }
        }
        (InInterface, InCycle)=OutSource[OutInterface, OutSymbol, 0]
        InCycle=InCycle+InInterface.packetSize
        (PrevInInterface, PrevInCycle)=OutSource[OutInterface, OutSymbolPath, OutCycle]
        Jump=InCycle-PrevInCycle
        PatternRam[OutInterface, OutSymbolPath, (OutCycle+1)]=(InInterface, InSymbolPath, Jump)
    }
}
```

Below is a description of the results of applying the algorithm of the above pseudo code to a specific example. In the example, input packet (A,A,B,B,C,D), which is 2 symbols wide and 3 symbols long, is received on 2-symbol-path interface #0, and input packet (G,H,I), which is 2 symbols wide and 2 symbols long (with an empty symbol on the second cycle of the second symbol path), is received on 2-symbol-path interface #1, and output packet (G,H,I,A,B,C,A,B,D), which is 3 symbols wide and 3 symbols long, is output on 3-symbol-path output interface #0. Thus, in the case of input packet (A,A,B,B,C,D), symbols A, B, and C are received on the first symbol path of input interface #0, on the first, second, and third input cycles, respectively, and symbols A, B, D are received on the second symbol path of input interface #0, on the first, second, and third input cycles, respectively. Similarly, in the case of input packet (G,H,I), symbols G and I are received on the first symbol path of input interface #1, on the first and second input cycles, respectively, and symbol H is received on the second symbol path of input interface #1 on the first cycle. Similarly, with respect to the output packet, symbols G, A, and A are output on the first symbol path of output interface #0, on the first, second, and third output cycles, respectively; symbols H, B, and B are output on the second symbol path of output interface #0, on the first, second, and third output cycles, respectively; and symbols I, C, and D are output on the third symbol path of output interface #0, on the first, second, and third output cycles, respectively.

Applying the algorithm of the above pseudo-code for determining the pattern memory data, the following results are determined for the InCount values of the input symbols: InCount[A]=2, InCount[B]=2, InCount[C]=1, InCount[D]=1, InCount[G]=1, InCount[H]=1, and InCount[I]=1. Similarly, the following results are determined for the InSource [InName, InCount[InName]]. (InInterface,InSymbolPath,InCycle) values of the input symbols: InSource[A,0]=(0,0,0), which represents the InSource value for the 0th occurrence of A, indicates that the source for that symbol is input interface 0, input symbol path 0, and input cycle 0; InSource[A,1]=(0,1,0), which represents the InSource value for the 1st occurrence of A, indicates that the source for that symbol is input interface 0, input symbol path 1, and input cycle 0; InSource[B,0]=(0,0,1), which represents the InSource value for the 0th occurrence of B, indicates that the source for that symbol is input interface 0, input symbol path 0, and input cycle 1; InSource[B,1]=(0,1,1), which represents the InSource value for the 1st occurrence of B, indicates that the source for that symbol is input interface 0, input symbol path 1, and input cycle 1; InSource[C,0]=(0,0,2), which represents the InSource value for the 0th occurrence of C, indicates that the source for that symbol is input interface 0, input symbol path 0, and input cycle 2; InSource[D,0]=(0,1,2), which represents the InSource value for the 0th occurrence of D, indicates that the source for that symbol is input interface 0, input symbol path 1, and input cycle 2; InSource[G,0]=(1,0,0), which represents the InSource value for the 0th occurrence of G, indicates that the source for that symbol is input interface 1, input symbol path 0, and input cycle 0; InSource[H,0]=(1,1,0), which represents the InSource value for the 0th occurrence of H, indicates that the source for that symbol is input interface 1, input symbol path 1, and input cycle 0; InSource[I,0]=(1,0,1), which represents the InSource value for the 0th occurrence of I, indicates that the source for that symbol is input interface 1, input symbol path 0, and input cycle 1.

Applying the algorithm of the pseudo-code for determining the pattern memory data, the following results are determined for the OutCount values of the output symbols: OutCount[A]=2, OutCount[B]=2, OutCount[C]=1, OutCount[D]=1, OutCount[G]=1, OutCount[H]=1, and OutCount[I]=1. Similarly, the following results are determined for the OutSource[OutInterface, OutSymbolPath, OutCycle]=(InInterface, InSymbolPath, InCycle) values of the output symbols: OutSource[0,0,0]=(1,0,0), which represents the OutSource value for the symbol G, indicates that it is output via output interface 0, output symbol path 0, on output cycle 0 and was received via input interface 1, input symbol path 0, on input cycle 0; OutSource[0,0,1]=(0,0,0), which represents the OutSource value for the $0^{th}$ occurrence of symbol A, indicates that it is output via output interface 0, output symbol path 0, on output cycle 1 and was received via input interface 0, input symbol path 0, on input cycle 0; OutSource[0,0,2]=(0,1,0), which represents the OutSource value for the $1^{st}$ occurrence of symbol A, indicates that it is output via output interface 0, output symbol path 0, on output cycle 2 and was received via input interface 0, input symbol path 1, on input cycle 0; OutSource[0,1,0]=(1,1,0), which represents the OutSource value for the symbol H, indicates that it is output via output interface 0, output symbol path 1, on output cycle 0 and was received via input interface 1, input symbol path 1, on input cycle 0; OutSource[0,1,1]=(0,0,1), which represents the OutSource value for the $0^{th}$ occurrence of symbol B, indicates that it is output via output interface 0, output symbol path 1, on output cycle 1 and was received via input interface 0, input symbol path 0, on input cycle 1; OutSource[0,1,2]=(0,1,1), which represents the OutSource value for the $1^{st}$ occurrence of symbol B, indicates that it is output via output interface 0, output symbol path 1, on output cycle 2 and was received via input interface 0, input symbol path 1, on input cycle 1; OutSource[0,2,0]=(1,0,1), which represents the OutSource value for the symbol 1, indicates that it is output via output interface 0, output symbol path 2, on output cycle 0 and was received via input interface 1, input symbol path 0, on input cycle 1; OutSource[0,2,1]=(0,0,2), which represents the OutSource value for the symbol C, indicates that it is output via output interface 0, output symbol path 2, on output cycle 1 and was received via input interface 0, input symbol path 0, on input cycle 2; and OutSource[0,2,2]=(0,1,2), which represents the OutSource value for the symbol D, indicates that it is output via output interface 0, output symbol path 2, on output cycle 2 and was received via input interface 0, input symbol path 1, on input cycle 2.

Applying the algorithm of the pseudo-code for determining the pattern memory data, the following results are determined for the PatternRam[OutInterface, OutSymbolPath, OutCycle]=(InInterface, InSymbolPath, Reset or Jump) values for output interface 0 and symbol path 0: PatternRam[0,0,0]=(1,0,0), which represents the PatternRam value for the symbol output via output interface 0, output symbol path 0, on output cycle 0, indicates that the symbol was received from via input interface 1, input symbol path 0, and has a read pointer value of 0, which is a reset value since the symbol was output on output cycle 0; PatternRam[0,0,1]=(0,0,+0), which represents the PatternRam value for the symbol output via output interface 0, output symbol path 0, on output cycle 1, indicates that the symbol was received via input, interface 0, input symbol path 0, and has a jump value of +0 between the previous read pointer value (i.e., the read pointer value for PatternRam[0,0,0]) and the current read pointer value (i.e., the read pointer value for PatternRam[0,0,1]); PatternRam[0,0,2]=(0,1,+0), which represents the PatternRam value for the symbol output via output interface 0, output symbol path 0, on output cycle 2, indicates that the symbol was received via input interface 0, input symbol path 1, and has a jump value of +0 between the previous read pointer value (i.e., the read pointer value for PatternRam[0,0,1]) and the current read pointer value (i.e., the read pointer value for PatternRam[0,0,2]); PatternRam[0,0,3]=(1,0,+3), which represents the PatternRam value for the symbol output via output interface 0, output symbol path 0, on output cycle 3, indicates that the symbol was received via input interface 1, input symbol path 0, and has a jump value of +3 between the previous read pointer value (i.e., the read pointer value for PatternRam[0,0,2]) and the current read pointer value (i.e., the read pointer value for PatternRam[0,0,3]). In one embodiment, for an output packet that is 3 symbols long, for each output interface and output symbol path combination, there are four PatternRam entries. Therefore, after PatternRam[0,0,3], the process is repeated at PatternRam[0,0,1].

Similarly, the following PatternRam values are determined for output interface 0, symbol path 1: PatternRam[0,1,0]=(1,1,0), which represents the PatternRam value for the symbol output via output interface 0, output symbol path 1, on output cycle 0, indicates that the symbol was received via input interface 1, input symbol path 1, and has a read pointer value of 0, which is a reset value since the symbol was output on output cycle 0; PatternRam[0,1,1]=(0,0,+1), which represents the PatternRam value for the symbol output via output interface 0, output symbol path 1, on output cycle 1, indicates that the symbol was received via input interface 0, input symbol path 0, and has a jump value of +1 between the previous read pointer value (i.e., the read pointer value for PatternRam[0,1,0]) and the current read pointer value (i.e., the read pointer value for PatternRam[0,1,1]); PatternRam[0,1,2]=(0,1,+0), which represents the PatternRam value for the symbol output via output interface 0, output symbol path 1, on output cycle 2, indicates that the symbol was received via input interface 0, input symbol path 1, and has a jump value of +0 between the previous read pointer value (i.e., the read pointer value for PatternRam[0,1,1]) and the current read pointer value (i.e., the read pointer value for PatternRam[0,1,2]); PatternRam[0,1,3]=(1,1,+2), which represents the PatternRam value for the symbol output via output interface 0, output symbol path 1, on output cycle 3, indicates that the symbol was received via input interface 1, input symbol path 1, and has a jump value of +2 between the previous read pointer value (i.e., the read pointer value for PatternRam[0,1,2]) and the current read pointer value (i.e., the read pointer value for PatternRam[0,1,3]). After PatternRam[0,1,3], the process is repeated at PatternRam[0,1,1].

Similarly, the following PatternRam values are determined for output interface 0, symbol path 2: PatternRam[0,2,0]=(1,0,1), which represents the PatternRam value for the symbol output via output interface 0, output symbol path 2, on output cycle 0, indicates that the symbol was received via input interface 1, input symbol path 0, and has a read pointer value of 1, which is a reset value since the symbol was output on output cycle 0; PatternRam[0,2,1]=(0,0,+1), which represents the PatternRam value for the symbol output via output interface 0, output symbol path 2, on output cycle 1, indicates that the symbol was received via input interface 0, input symbol path 0, and has a jump value of +1 between the previous read pointer value (i.e., the read pointer value for PatternRam[0,2,0]) and the current read pointer value (i.e., the read pointer value for PatternRam[0,2,1]); PatternRam[0,2,2]=(0,1,+0), which represents the PatternRam value for the symbol output via output interface 0, output symbol path 2, on output cycle 2, indicates that the symbol was received via input interface 0, input symbol path 1, and has a jump value of +0 between the previous read pointer value (i.e., the read pointer value for PatternRam[0,2,1]) and the current read pointer value (i.e., the read pointer value for PatternRam[0,2,2]); PatternRam[0,2,3]=(1,0,+2), which represents the PatternRam value for the symbol output via output interface 0, output symbol path 2, on output cycle 3, indicates that the symbol was received via input interface 1, input symbol path 0, and has a jump value of +2 between the previous read pointer value (i.e., the read pointer value for PatternRam[0,2,2]) and the current read pointer value (i.e., the read pointer value for PatternRam[0,2,3]). After PatternRam[0,2,3], the process is repeated at PatternRam[0,2,1].

In one embodiment, the data stored in the pattern memory, more specifically the PatternRam data, is used to program the PFC of the present invention. In one embodiment, the PatternRam data is sent from the pattern memory to the output pattern state machine. The output pattern state machine uses the PatternRam data to determine control signals for controlling the PFC to provide the desired packet format conversion.

In one embodiment, the output pattern state machine uses the PatternRam[OutInterface, OutSymbolPath, OutCycle] data to identify the OutInterface, OutSymbolPath, and OutCycle on which to send out an output field. Moreover, the output pattern state machine uses the (InInterface, InSymbolPath, Reset or Jump) value corresponding to the PatternRam [OutInterface, OutSymbolPath, OutCycle] to determine the control signals for multiplexers of the PFC (such as multiplexers 371, 372, 373, and 374 of PFC 300) to select the proper symbols received from various memories for outputting. More specifically, it uses the InInterface and InSymbolPath data to determine those control signals. Thus, for example, if the InInterface and InSymbolPath data indicate that the field to be output was received via input interface 310-1 on the first symbol path, then the data received via input interface 310-1 on the first symbol path would be selected by the multiplexer and provided to the output interface. The Reset value is used by the output pattern state machine to determine the reset value to provide to the proper read pointer. Similarly, the Jump value is used by the output pattern state machine to determine the jump value to provide to the adder coupled to proper read pointer in order to increment the read pointer value for the proper read pointer by the desired amount.

It is to be noted in PFCs 100, 200, and 300, a write pointer is incremented by one on each subsequent writing of a field into memory, whereas a read pointer is incremented by a jump value on each subsequent reading of a field from memory. In another embodiment, the write pointer may be incremented by a proper jump value on each subsequent writing of a field into memory, whereas the read pointer may be incremented by one on each subsequent reading of a field from memory. It will be appreciated by those skilled in the art that using this alternative embodiment of incrementing the write and read pointers would require modifying the above described embodiments of determining the pattern memory data. Those skilled in the art will also appreciated that this alternative embodiment would also require modifying interconnections of some of the components in the illustrated PFCs and the interchange of some of the components. With the benefit of the description herein, those skilled in the art will be able to determine the details of the required modifications. Accordingly, such alternative embodiments will not be described in detail herein.

Figure 5:
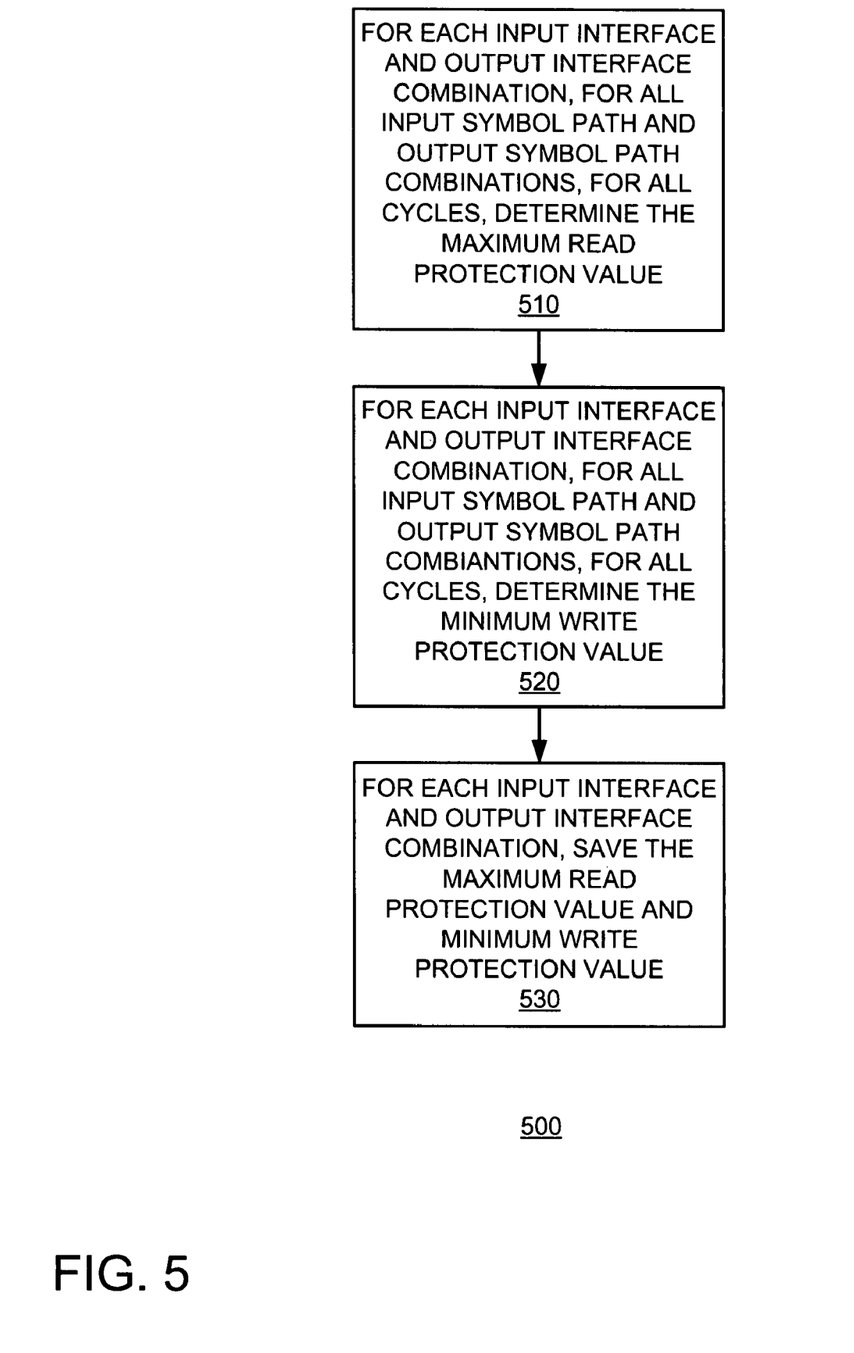
FIG. 5 is a flowchart for one embodiment of the method of the present invention for determining read protection and write protection values.

FIG. 5 is a flowchart for one embodiment of the method of the present invention for determining read protection and write protection values. At 510, for each input interface and output interface combination, for all input symbol path and output symbol path combinations, for all cycles, the maximum read protection value (rp) is determined. This determines how long the output side of the PFC has to wait before reading data in order to avoid reading an entry that has not yet been written. The read protection value (rp) is the maximum difference between the output read pointer and the input write pointer values. In one embodiment, the write pointer is incremented by one for each input data written into memory. As a result, in such an embodiment, the input write pointer is the same as the input write counter.

At 520, for each input interface and output interface combination, for all input symbol path and output symbol path combinations, for all cycles, the minimum write protection value (wp) is determined. This determines how far ahead of the read pointer the write pointer can get without writing over data that has not yet been read out. The write protection value (wp) is the minimum sum of (1) the memory size and (2) the difference between the in cycle count and the out cycle count over all the combinations described above. It is to be noted that the wp value is updated only when the read pointer value is equal to the write pointer value.

At 530, for each input interface and output interface combination, maximum read protection value (rp) and minimum write protection value (wp) are saved. If the maximum read protection value (rp) is greater than or equal to the minimum write protection value (wp), then an error message is issued indicating that the memory size is too small. As a result, a larger memory size must be selected. The maximum read protection value (rp) and minimum write protection value (wp) for each input interface and output interface combination are used by the backpressure control as described in relation to FIG. 6 below.

Below is pseudo code that describes the method of the present invention for determining the maximum read protection value (rp) and minimum write protection value (wp). To the extent there are any inconsistencies between the pseudo code and flowchart 500 of FIG. 5 and its associated description, flowchart 500 and its associated description should be interpreted in a manner consistent with the method set forth in the below pseudo code.

```
For each output interface OutInterface {
    For each input interface InInterface {
        //1. Determine the Read Protection value for this combination. This determines
        // how long the output side of the PFC has to wait before reading data, in order
        // to avoid reading an entry that hasn't been written yet.
        rp<=0
        InNumCycles<=numberOfCyclesPerPacket(InInterface)
        OutNumCycles<=numberOfCyclesPerPacket(OutInterface)
        NumCycles<=max (InNumCycle, OutNumCycles)
        For each output symbol path OutSymbolPath {
            For each input symbol path InSymbolPath {
                For (Cycle<=0; Cycle<NumCycles+1; Cycle++) {
                    InWritePointer<=Cycle % memSize
                    OutReadPointer<=getReadPointer(OutInterface, OutSymbolPath, Cycle) % memSize rp<=max (rp, OutReadPointer-InWritePointer)
                }
            }
        }
        //2. Determine the Write Protection value for the combination. This determines
        // how far ahead of the read pointer the write pointer can get without writing
        // data that hasn't been read yet.
        wp<=memSize
        For each output symbol path OutSymbolPath {
            For each input symbol path InSymbolPath {
                For (OutCycle<=0; OutCycle<memSize; OutCycle++) {
                    For (InCycle<=0; InCycle<memSize; InCycle++) {
                        InWritePointer<=Cycle % memSize
                        OutReadPointer<=getReadPointer(OutInterface, OutSymbolPath, Cycle) % memSize
                        If (OutReadPointer==InWritePointer) {
                            wp=min (wp, memSize+InCycle-OutCycle);
                        }
                    }
                }
            }
        }
        //3. Save the worst case read & write protection values.
        If (wp<rp)
            Error: Memory too small.
        }
        readProtect[OutInterface, InInterface,]=rp;
        writeProtect[OutInterface, InInterface]=wp;
    }
}
```

Figure 6:
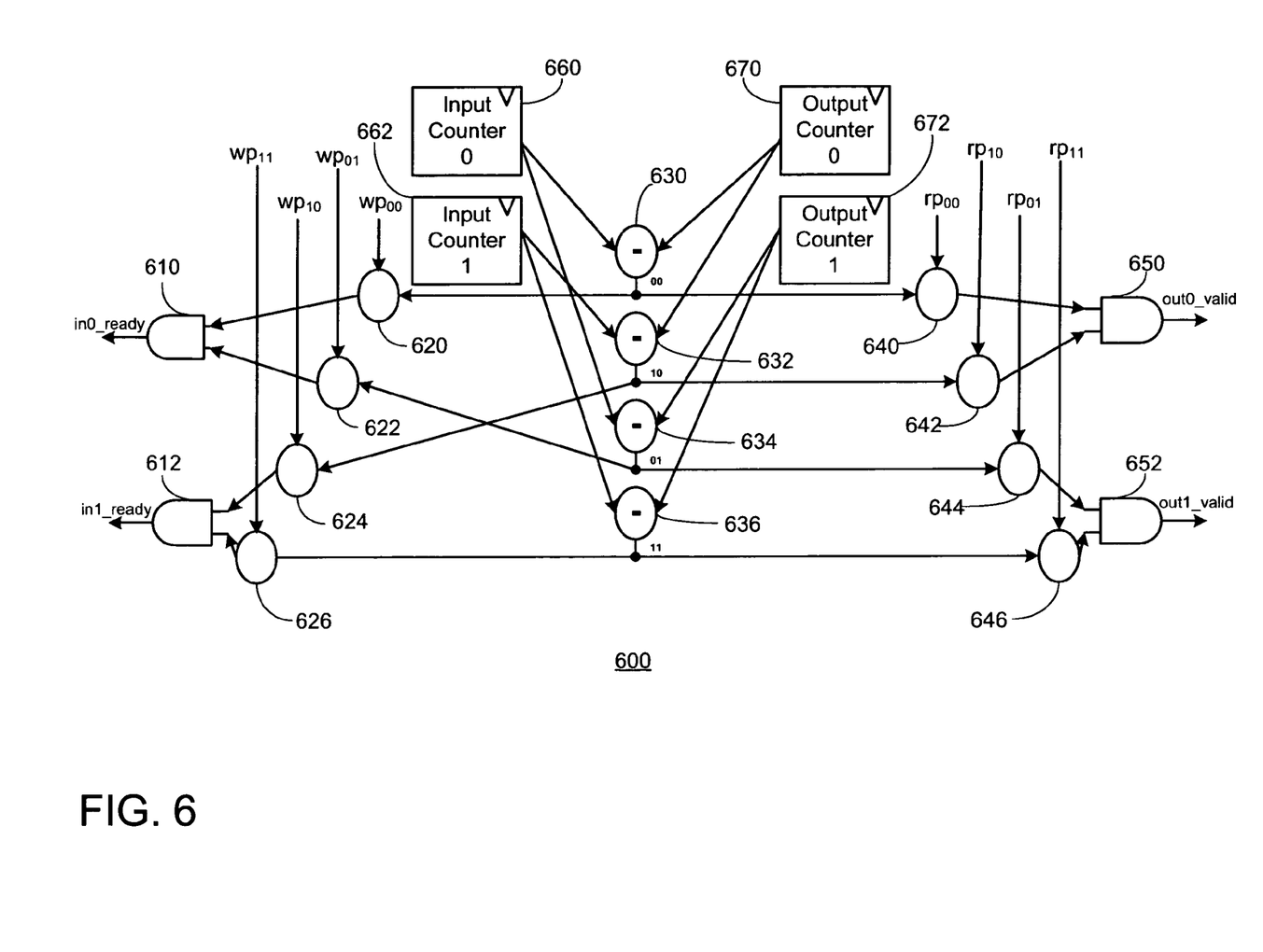
FIG. 6 is a block diagram of one embodiment of the backpressure control of the present invention.

FIG. 6 is a block diagram of one embodiment of the backpressure control of the present invention. Backpressure control 600 is for a PFC which has two input interfaces and two output interfaces. Backpressure control 600 receives the maximum read protection values and minimum write protection values for all combinations of the input and output interfaces for the PFC. More specifically, backpressure control 600 receives $rp_{00}$, $rp_{10}$, $rp_{01}$, $rp_{11}$ and $wp_{00}$, $wp_{10}$, $wp_{01}$, $wp_{11}$, where $rp_{xy}$ represents the maximum read protection value for the input interface x and output interface y combination and $wp_{xy}$ represents the minimum write protection value for the input interface x and output interface y combination. For example, $rp_{10}$ represents the maximum read protection value for the input interface 1 and output interface 0 combination, whereas $wp_{01}$ represents the minimum write protection value for the input interface 0 and output interface 1 combination. Backpressure control 600 includes input counters 660 and 662 for counting the input cycles for input interface 0 and 1, respectively. Additionally, backpressure control 600 includes output counters 670 and 672 for counting the output cycles for input interface 0 and 1, respectively.

It is to be noted that the input counter values and output counter values used in backpressure control 600 are not the same as the InCycle and OutCycle values used in algorithms of FIGS. 4 and 5 and the associated pseudo codes above. In one embodiment, the input counter values and the output counter values are limited by the memory size for storing symbols. On the other hand, the InCycle and OutCycle values are limited by the number of cycles (packet length) for the respective input and output packets.

In the embodiment shown in FIG. 6, input counters 660 and 662 and output counters 670 and 672 are shown as being part of backpressure control 600. In another embodiment, those counters may not be part of backpressure control 600. For example, input counters 660 and 662 may be part of the input I/F control of the PFC whereas output counters 670 and 672 may be part of the output I/F control of the PFC. In such a case, those counters would supply their count values to backpressure control 600.

Using subtractors 630, 632, 634, and 636, backpressure control 600 determines the difference between the input cycle count and output cycle count values for all combinations of input interfaces and output interfaces. Subtractors 630, 632, 634, and 636 determine the difference 00, 10, 01, and 11, which represent the difference between input cycle count and output cycle count values for the input interface 0 and output interface 0 combination, the input interface 1 and output interface 0 combination, the input interface 0 and output interface 1 combination, and the input interface 1 and output interface 1 combination, respectively. Subtractors 630, 632, 634, and 636 respectively provide differences 00, 10, 01, and 11 to comparators 620, 624, 622, and 626, respectively. Subtractors 630, 632, 634, and 636 also respectively provide differences 00, 10, 01, and 11 to comparators 640, 642, 644, and 646, respectively.

Comparators 620, 624, 622, and 626 also respectively receive $wp_{00}$, $wp_{10}$, $wp_{01}$, and $wp_{11}$. Similarly, comparators 640, 642, 644, and 646 respectively receive $rp_{00}$, $rp_{10}$, $rp_{01}$, and $rp_{11}$. Each of comparators 620, 622, 624, and 626 compares the difference value it receives with the wp value that it receives. If the difference value is less than or equal to the wp value, then the comparator issues a high binary value. Otherwise, it issues a low binary value. Similarly, each of comparators 640, 642, 644, and 646 compares the difference value it receives with the rp value that it receives. If the difference value is greater than the rp value, then the comparator issues a high binary value. Otherwise, it issues a low binary value.

The outputs of comparators 620 and 622 are supplied to AND gate 610. If the outputs of both comparators 620 and 622 that AND gate 610 receives have a high binary value, then AND gate 610 outputs a high binary value indicating that input interface 0 is ready to receive a symbol. Otherwise, AND gate 610 outputs a low binary value indicating that input interface 0 is not ready to receive a symbol. Similarly, the outputs of comparators 624 and 626 are supplied to AND gate 612. If the outputs of both comparators 624 and 626 that AND gate 612 receives have a high binary value, then AND gate 612 outputs a high binary value indicating that input interface 1 is ready to receive a symbol. Otherwise, AND gate 612 outputs a low binary value indicating that input interface 1 is not ready to receive a symbol.

The outputs of comparators 640 and 642 are supplied to AND gate 650. If the outputs of both comparators 640 and 642 that AND gate 650 receives have a high binary value, then AND gate 650 outputs a high binary value indicating that output interface 0 has valid symbols to output. Otherwise, AND gate 650 outputs a low binary value indicating that output interface 0 does not have valid symbols to output. Similarly, the outputs of comparators 644 and 646 are supplied to AND gate 652. If the outputs of both comparators 644 and 646 that AND gate 652 receives have a high binary value, then AND gate 652 outputs a high binary value indicating that output interface 1 has valid symbols to output. Otherwise, AND gate 652 outputs a low binary value indicating that output interface 1 does not have valid symbols to output.

It is to be noted that PFCs 100, 200, and 300 are not limited to the packet format conversions illustrated in FIGS. 1, 2, and 3, respectively. Instead, as each of PFCs 100, 200, and 300 is a programmable PFC, each can provide multiple, different packet format conversions. More specifically, in one embodiment, these PFCs are programmable during run-time. In one embodiment, a PFC of the present invention is programmed using the data stored in the pattern memory.

For example, PFC 300 can perform any packet format conversion involving two input interfaces (with 2 symbol paths per each input interface) and two output interfaces (with 2 symbol paths per each output interface). In one embodiment, PFC 300 can also perform any packet format conversion involving less than two input interfaces (with 2 or less symbol paths per each input interface) and less than two output interfaces (with 2 or less paths per each output interface). In one embodiment, an output I/F that is not being used can be idle. The specific packet format conversion performed is depended on the pattern memory data. The ability to change the pattern memory data allows reprogramming the PFC to perform multiple, different packet format conversions.

In one embodiment, PFCs of the present invention support multi-packet mapping. In the multi-packet mapping format, the PFC is not limited to mapping a single input packet to a single output packet. In other words, the number of input packets need not equal the number of output packets. For example, three input packets (A, B, C, A, B) can be mapped to two output packets (A, B, C, A, B, C, A, B, C). Multi-packet mapping supports multiple input and output interfaces, but the packet ratio must be constant across all input interface/output interface pairs.

Without multi-packet mapping enabled, there must be one input packet on each input interface for each output packet on each output interface. With multi-packet mapping enabled, the ratio of input packets to output packets must be the same for every field. For example, if the input packet has one A field and the output packet has two A fields, then there must be two input packets for every one output packet, i.e., the ratio of input packets to output packets is two for field A. In the above example, if the input and output packets also have one or more fields B, then the input packets to output packets ratio for field B must also be equal to two. It is to be noted that in both cases (whether with or without multi-packet mapping enabled), however, the number of fields in the output must be equal to the number of fields in the input. More specifically, the number of fields for any particular field name must be equal on the input and output side.

In one embodiment, the PFC can also support packets of unknown length, which are designated by the format ( . . . )+. In the unknown length case, the start of packet and the end of packet markers on the input interfaces are used to drive the start of packet and end of packet markers on the output interfaces. In one embodiment, when using packets of unknown length, there can be only one input interface, although there may be multiple output interfaces. Otherwise, it would not be possible to determine which input interface is to control the output start of packet and end of packet signals. In another embodiment, when using packets of unknown length, there may be more than one input interface provided that there is only one input interface that has packets of unknown length.

PFCs embodying the present invention might be included in a variety of integrated circuits (ICs), including ICs that are programmable logic devices (PLDs). PLDs (also sometimes referred to as complex PLDs (CPLDs), programmable array logic (PALs), programmable logic arrays (PLAs), field PLAs (FPLAs), erasable PLDs (EPLDs), electrically erasable PLDs (EEPLDs), logic cell arrays (LCAs), field programmable gate arrays (FPGAs), or by other names) provide the advantages of fixed ICs with the flexibility of custom ICs. Such devices typically provide an "off the shelf" device having at least a portion that can be programmed to meet a user's specific needs. Application specific integrated circuits (ASICs) have traditionally been fixed ICs. However, it is possible to provide an ASIC that has a portion or portions that are programmable. Thus, it is possible for an IC device to have qualities of both an ASIC and a PLD. The term PLD as used herein will be considered broad enough to include such devices.

PLDs have configuration elements that may be programmed or reprogrammed. Configuration elements may be realized as RAM bits, flip-flops, electronically erasable programmable read-only memory (EEPROM) cells, or other memory elements. Placing new data into the configuration elements programs or reprograms the PLD's logic functions and associated routing pathways. Configuration elements that are field programmable are often implemented as RAM cells (sometimes referred to a "configuration RAM" (CRAM)). However, many types of configurable elements may be used including static or dynamic RAM (SRAM or DRAM), electrically erasable read-only memory (EEROM), flash, fuse, and anti-fuse programmable connections. The programming of configuration elements could also be implemented through mask programming during fabrication of the device. While mask programming may have disadvantages relative to some of the field programmable options already listed, it may be useful in certain high volume applications.

Figure 7:
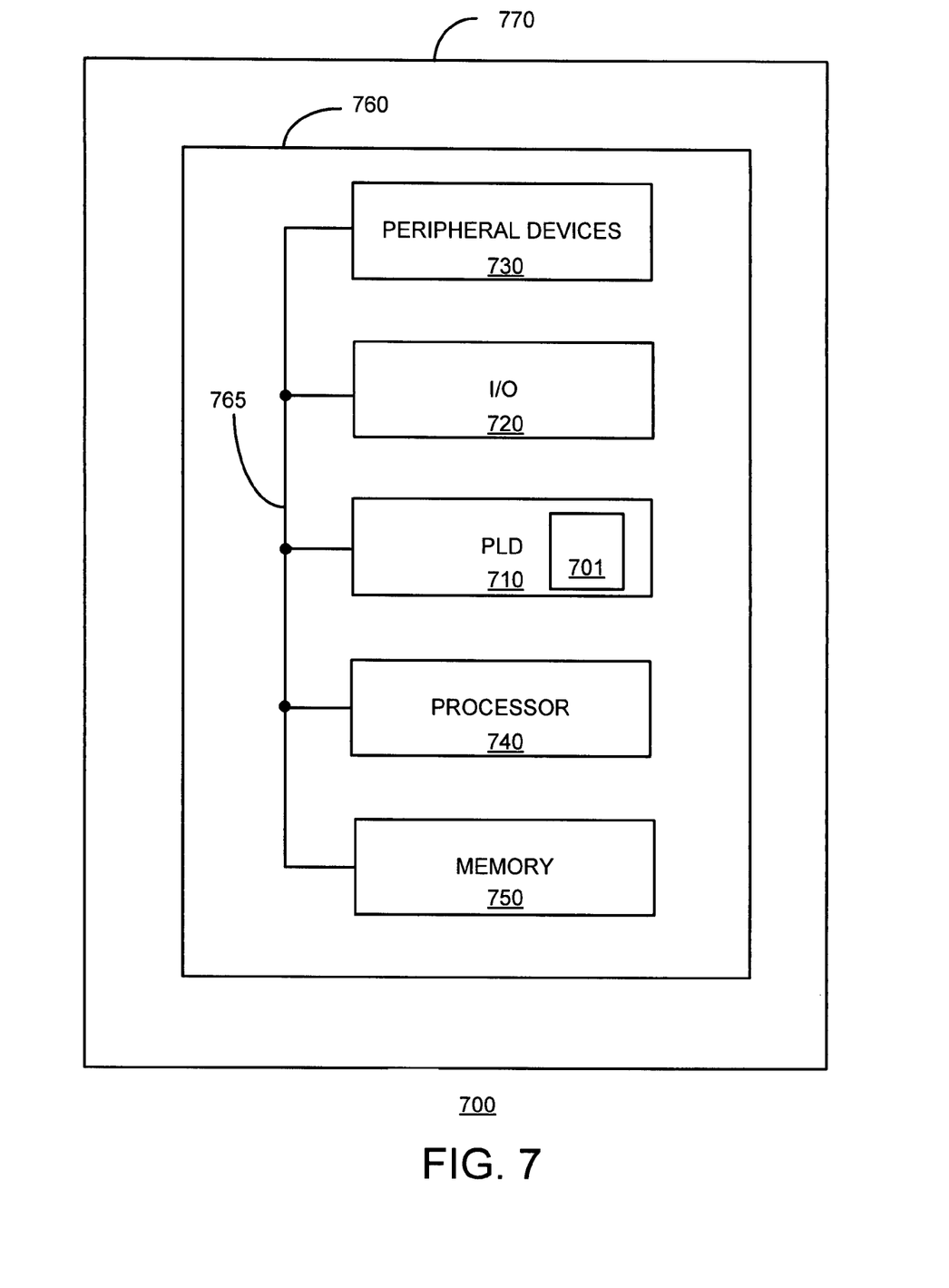
FIG. 7 illustrates an exemplary data processing system including an exemplary programmable logic device in which PFCs in accordance with the present invention might be implemented.

FIG. 7 illustrates, by way of example, PLD 710 in data processing system 700. As one example, PFCs of this invention may be implemented in PLDs such as PLD 710. In one embodiment, PFC 701 (such as PFC 100, 200 or 300, shown in FIG. 1, 2 or 3, respectively) is on the same die/chip as PLD 710. Data processing system 700 may include one or more of the following components: processor 740, memory 750, input/output (I/O) circuitry 720, and peripheral devices 730. These components are coupled together by system bus 765 and are populated on circuit board 760 which is contained in end-user system 770. A data processing system such as system 700 may include a single end-user system such as end-user system 770 or may include a plurality of systems working together as a data processing system.

System 700 can be used in a wide variety of applications, such as computer networking, data networking, instrumentation, video processing, digital signal processing (DSP), or any other application where the advantage of using programmable or reprogrammable logic is desirable. PLD 710 can be used to perform a variety of different logic functions. For example, PLD 710 can be configured as a processor or controller that works in cooperation with processor 740 (or, in alternative embodiments, a PLD might itself act as the sole system processor). PLD 710 may also be used as an arbiter for arbitrating access to a shared resource in system 700. In yet another example, PLD 710 can be configured as an interface between processor 740 and one of the other components in system 700. It should be noted that system 700 is only exemplary.

In one embodiment, system 700 is a digital system. As used herein a digital system is not intended to be limited to a purely digital system, but also encompasses hybrid systems that include both digital and analog subsystems.

As noted above, the PFC of the present invention has many applications. Below is a description of some of those applications.

In many situations, it is desirable to time multiplex data associated with multiple sources onto a single bus. For example, the sampling frequency of data captured from various antenna sources may be significantly less than the clock frequency of a block (e.g., an FPGA). By multiplexing the data onto a single bus, one may be able to exploit IP that is optimized to process time multiplexed input streams. In such a situations, for example, four input interfaces, each receiving packets that have one symbol path (i.e., have a symbol per beat rate of 1) may be supplied to a PFC which provides output packets on one output interface that has four symbol paths (i.e., has a symbol per beat rate of 4).

Similarly, often after exploiting time division multiplexing within a design, demultiplexing the channelized data stream may be desired so that the data may be passed off the chip or to other modules that do not support multiple channel processing. In such a situation, the PFC may be used as a demultiplexer. For example, the PFC may have one input interface that receives data packets having four symbol paths (i.e., has a symbol per beat rate of 4) and four output interfaces each of which outputs data packets having one symbol path (i.e., has a symbol per beat rate of 1), Also, sometimes it is sometime desirable to reorder the symbols within a packet. For example, this scenario often arises when an algorithm is implemented in hardware to exploit certain optimizations, but the output may not be compatible with other IP. These incompatibilities may be bridged by the PFC, and this implementation strategy removes the effort required to verify custom time slot rearrangement logic. For example, the PFC may convert a packet of format (A, B, A, B) to one of a format (A, A, B, B).

The PFC of the present invention may also be used to synchronize data from multiple sources. Such synchronization may be necessary, for example, to perform an arithmetic operation on two different input packets (e.g., addition or multiplication) received from two different sources. The PFC may be used to provide such synchronization by, for example, accepting the two different input packets (A1, B1, C1, D1) and (A2, B2, C2, D2) on two different input interfaces (where each input packet has a symbol per beat rate of 1) and providing output packets (A1, A2, B1, B2, C1, C2, D1, D2) on an output interface (where the output packets have a symbol per beat rate of 2).

In one embodiment, the PFC of the present invention is implemented in a system-builder set of tools (which are also sometimes referred to as system-level tools), such as, for example, the SOPC-Builder™ or DSP Builder (available from Altera® Corporation) or CORE Generator™ (available from Xilinx®, Inc.). The integration of the PFC of the present invention with the system builder set of tools (e.g., SOPC-Builder™ or DSP Builder) allows one to easily parameterize a highly efficient datapath. The portfolio of configurable IP blocks and control logic allows for a very high design entry point, while enabling one to achieve a very low-level of architectural flexibility by modifying parameters.

In one embodiment, the PFC converts packet formats given only a description of the formats to be converted from/to.

While the present invention has been particularly described with respect to the illustrated embodiments, it will be appreciated that various alterations, modifications and adaptations may be made based on the present disclosure, and are intended to be within the scope of the present invention. While the invention has been described in connection with what are presently considered to be the most practical and preferred embodiments, it is to be understood that the present invention is not limited to the disclosed embodiments but, on the contrary, is intended to cover various modifications and equivalent arrangements included within the scope of the appended claims.

What is claimed is:

1. A packet format converter (PFC) comprising:
a pattern state machine; and
a pattern memory coupled to the pattern state machine;
wherein the pattern memory stores pattern memory data including pointer information, the pattern state machine is programmed based on the pattern memory data, and the PFC can be programmed to perform any one of a plurality of different packet format conversions.

2. The PFC of claim 1,
wherein the pattern memory data includes input interface and input symbol path information of an input source associated with an output field.

3. The PFC of claim 2 further comprising:
a backpressure control for issuing ready and valid signals for the PFC, wherein the ready signal indicates whether the ITC is ready to accept input data and the valid signal indicates whether the PFC has valid data to output.

4. The PFC of claim 3, wherein the pattern state machine is an output pattern state machine and the pointer information is read pointer information for data to be output by the PFC.

5. The PFC of claim 4 further comprising:
a first input interface (I/F) control coupled to the backpressure control, wherein the backpressure control sends a ready signal to the first input I/F control;

a first write pointer coupled to the first input I/F control, wherein the first input I/F control sends a clock enable signal to the first write pointer;

a first output I/F control coupled to the backpressure control and the output pattern state machine, wherein the backpressure control sends a valid signal to the first output I/F control; and a first read pointer coupled to the first output I/F; and a first memory coupled to the first write pointer and the first read pointer, wherein the first memory stores input data received via a first input I/F.

6. The PFC of claim 5, wherein the first output I/F control sends a clock enable signal to the first read pointer and the output pattern state machine.

7. The PFC of claim 5 further comprising:

a second input I/F control coupled to the backpressure control, wherein the backpressure control sends a ready signal to the second input I/F control;

a second write pointer coupled to the second input I/F control, wherein the second input I/F control sends a clock enable signal to the second write pointer;

a second output I/F control coupled to the backpressure control and the output pattern state machine, wherein the backpressure control sends a valid signal to the second output I/F control; and a second read pointer coupled to the second output I/F;

an AND gate coupled to the first output IN control, the second output I/F control, and the output pattern state machine, wherein the first and second output I/F controls send clock enable signals to the AND gate, further wherein the AND gate sends a clock enable signal to the output pattern state machine, the first read pointer and the second read pointer; and a second memory coupled to the second write pointer and the second read pointer, wherein the second memory stores input data received via a second input I/F.

8. The PFC of claim 7 further comprising:

a first output I/F coupled to the first output I/F control;

a second output I/F coupled to the second output I/F control:

a first multiplexor coupled to the first memory, the second memory, the first output I/F control, and the output pattern state machine, wherein the first multiplexor receives data from the first and second memories and a control signal from the output pattern state machine; and a second multiplexor coupled to the first memory, the second memory, the second output I/F control, and the output pattern state machine, wherein the second multiplexor receives data from the first and second memories and control signal from the output pattern state machine.

9. A programmable logic device including the PFC of claim 1.

10. A digital system comprising a programmable logic device including the PFC of claim 1.

11. A packet format converter (PFC) comprising:

a pattern memory, wherein the pattern memory stores pattern memory data including read pointer information for data to be output by the PFC;

an output pattern state machine coupled to the pattern memory, wherein the output pattern state machine is programmed based on the pattern memory data;

a backpressure control for issuing ready and valid signals for the PFC, wherein the ready signal indicates whether the PFC is ready to accept input data and the valid signal indicates whether the PFC has valid data to output;

a first input interface (I/F) control coupled to the backpressure control, wherein the backpressure control sends a ready signal to the first input I/F control;

a first write pointer coupled to the first input I/F control, wherein the first input I/F control sends a clock enable signal to the first write pointer;

a first output I/F control coupled to the backpressure control and the output pattern state machine, wherein the backpressure control sends a valid signal to the first output I/F control;

a first read pointer coupled to the first output I/F; and a first memory coupled to the first write pointer and the first read pointer.

12. The PFC of claim 11, wherein the first output I/F control sends a clock enable signal to the first read pointer and the output pattern state machine.

13. The PFC of claim 11 further comprising:

a second input I/F control coupled to the backpressure control, wherein the backpressure control sends a ready signal to the second input I/F control;

a second write pointer coupled to the second input I/F control, wherein the second input I/F control sends a clock enable signal to the second write pointer;

a second output I/F control coupled to the backpressure control and the output pattern state machine, wherein the backpressure control sends a valid signal to the second output I/F control;

a second read pointer coupled to the second output I/F;

an AND gate coupled to the first output I/F control, the second output I/F control, and the output pattern state machine, wherein the first and second output I/F controls send clock enable signals to the AND gate, further wherein the AND gate sends a clock enable signal to the output pattern state machine, the first read pointer and the second read pointer; and a second memory coupled to the second write pointer and the second read pointer.

14. The PFC of claim 13 further comprising:

a first output I/F coupled to the first output I/F control;

a second output I/F coupled to the second output I/F control;

a first multiplexor coupled to the first-memory, the second memory, the first output I/F control, and the output pattern state machine, wherein the first multiplexor receives data from the first and second memories and a control signal from the output pattern state machine; and a second multiplexor coupled to the first memory, the second memory, the second output I/F control, and the output pattern state machine, wherein the second multiplexor receives data from the first and second memories and a control signal from the output pattern state machine.

15. A programmable logic device including the PFC of claim 11.

16. A digital system comprising a programmable logic device including the PFC of claim 11.

17. A method of packet format conversion comprising:

writing input fields of an input packet into one or more memories;

reading input fields of the input packet from the one or more memories for outputting as output fields of an output packet;

determining pattern memory data including pointer information, wherein determining the pattern memory data comprises determining an input source for each occurrence of an input field in the input packet and associating output source information for each occurrence of an output field in the output packet with the input source of the output field;

storing the pattern memory data in a pattern memory; and using the pointer information for the writing or reading.

18. The method of claim 17, wherein the pointer information is read pointer information and wherein the using includes using the read pointer information in the reading to output the output fields of the output packet.

19. The method of claim 18, wherein determining the pattern memory data further comprises:

determining read pointer reset value or jump value.

20. The method of claim 19, wherein the input source includes input interface, input symbol path, and input cycle information.

21. The method of claim 19, wherein the pattern memory data includes input interface and input symbol path information of the input source associated with the output field and wherein the read pointer information includes the reset value or the jump value.

22. The method of claim 21 further comprising:

sending input fields read from different memories to a multiplexer;

selecting one of the input fields for outputting as an output field, wherein the input interface and input symbol path of the pattern memory data associated with the output field is used as a control signal in the selecting.

23. The method of claim 17 further comprising:

determining maximum read protection values for each input interface and output interface combination; and determining minimum write protection values for each input interface and output interface combination.

24. The method of claim 23 further comprising:

comparing the maximum read protection value for an input interface and output interface combination with an input counter and an output counter difference for the input interface and output interface combination, to determine a ready signal for the input interface of the input interface and output interface combination and a valid signal for the output interface of the input interface and output interface combination.

* * * * *